March 12, 1935.  H. F. JOHNSON  1,994,361
GASKET FOR PIPE JOINTS
Filed Jan. 21, 1933
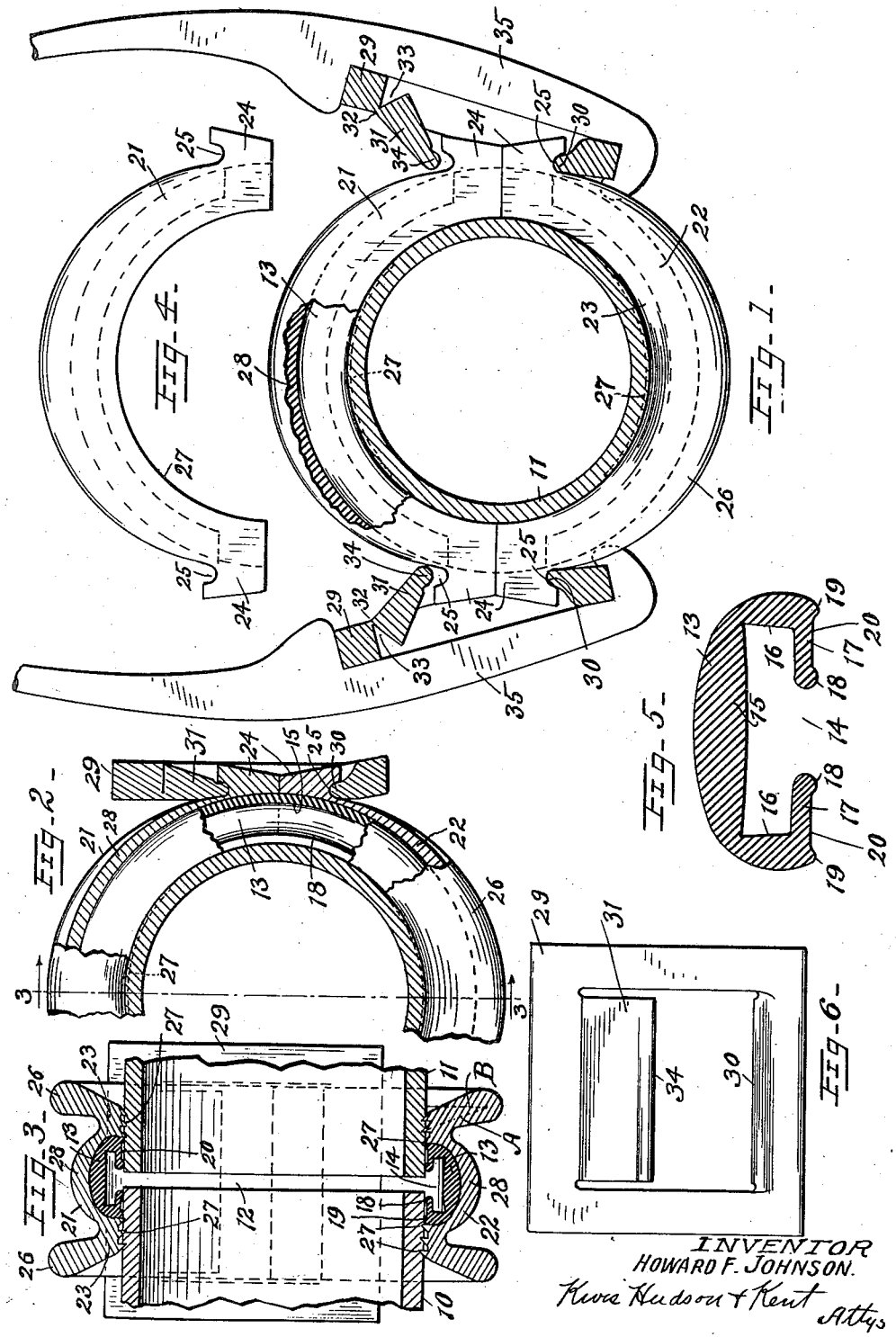
INVENTOR
HOWARD F. JOHNSON.

Patented Mar. 12, 1935

1,994,361

UNITED STATES PATENT OFFICE 1,994,361

GASKET FOR PIPE JOINTS

Howard F. Johnson, Cleveland, Ohio, assignor to The Champion Machine & Forging Company, Cleveland, Ohio, a corporation of Ohio Application January 21, 1933, Serial No. 652,830

4 Claims. (Cl. 288—1)

This invention relates to improvements in pipe joints, having reference particularly to joints between lengths of pipe in a pressure pipe line, where a perfect seal for the prevention of leakage is essential.

This application covers an improvement upon the gasket shown and more broadly claimed in the copending joint application of John F. Connelly and Howard F. Johnson, Serial No. 605,702, filed April 16, 1932.

One of the objects of the invention is the provision of a gasket of novel form presenting two spaced beads at the pipe surfaces of each of the two pipe ends, whereby the pressure of the clamping ring and of the fluid in the pipe is exerted upon the limited contact areas of the beads, so as to cause them to fill effectively any depressions in the more or less pitted external surfaces of the pipes.

Another object of the invention is the provision of a two-section clamping ring with clamping means therefor capable of being set quickly and effectively.

Another object is the provision of a novel clamp for securing together the ends of adjacent ring sections, or the ends of a split ring, quickly and firmly.

Still another object is the provision of means in the pipe coupling for compensating for the longitudinal expansion and contraction of pipe lengths due to temperature changes.

Other objects and features of novelty will appear as I proceed with the description of that embodiment of the invention which, for the purposes of the present application, I have illustrated in the accompanying drawing, in which Figure 1 is a transverse sectional view through a pipe adjacent a coupling embodying my invention, showing the parts during the course of assembly, the clamping frames for securing together the two sections of the clamping ring being shown in position ready to be set.

Fig. 2 is a fragmental view in transverse section, showing one of the clamping frames in operative position.

Fig. 3 is a longitudinal sectional view taken substantially on the line 3—3 of Fig. 2.

Fig. 4 is an elevational view of one section of the clamping ring.

Fig. 5 is a transverse sectional view of the gasket, and

Fig. 6 is a side elevational view of a clamping frame.

In the drawing I have indicated at 10 and 11 fragments of the adjacent ends of two pipe lengths to be joined. These pipe lengths are preferably laid with their ends spaced apart slightly, leaving an annular passage 12 through which pressure fluid in the pipe is free to pass. In accordance with my invention this annular passage 12 is covered or bridged by a rubber gasket 13 in the form of a hollow ring with an annular passage 14 in its inner wall adapted to register with the passage 12 between the pipe lengths. The hollow interior of the gasket is provided with a peripheral wall 15 and with a pair of side walls 16, the latter walls diverging outwardly to an extent sufficient to insure an angle between the walls 15 and 16 of no more than 90° even when the pipe lengths are contracted.

From the free edges of the side walls 16 flanges 17 extend inwardly or toward each other. These flanges are quite resilient, and each of them is provided on its inner surface, that is the surface facing the center of the ring, with two beads 18 and 19, spaced apart, so that an annular recess 20 is formed between them.

The gasket 13 is encircled and enclosed by a metal clamping ring formed preferably in two equal sections 21 and 22. The complete ring is provided with an annular internal cavity of the proper transverse size and shape to receive the gasket 13. On either side of the gasket cavity the ring has pipe engaging portions 23, while at the ends of each section there are laterally extending lips 24 having transverse grooves 25 therein. From the pipe engaging portions 23 of the clamping ring sections there extend outwardly reenforcing wings 26, which are relatively wide at a point midway between the ends of the section and taper down to practically nothing where they run into the lips 24. It will be noted from an inspection of Fig. 3 that these wings are arranged somewhat to one side of the pipe engaging portions 23, extending diagonally outward therefrom. Teeth 27 are formed upon the pipe engaging portions 23, being adapted to bite into the metal of the pipe when the clamping ring sections are drawn together. These teeth on each section extend for an arcuate distance of about 90°, midway between the ends of the section. Between the teeth and the ends of the section the pipe engaging portion 23 has a smooth surface presented to the pipe. It will be evident that a strong pull tending to separate the pipe sections will be strongly opposed by the wings 26, because such a pull will tend to bring the teeth 27 into the plane of the wings, which merely crowds the teeth further into the pipe owing to the fact that the line A is longer than the line B (Fig. 3).

The pipe engaging portions 23 of each section are connected by an arched portion 28. Although the ring sections are preferably metal forgings, and although the arched portion 28 is of substantial thickness, it nevertheless possesses resiliency and follows the pipe lengths in their expansion and contraction, bowing outward when the pipe lengths expand, and flattening when they contract. This movement in the arch 28 takes place chiefly between the sets of teeth 27, there being no arch behind the lips 24 at the ends of the section.

In order to secure the two sections 21 and 22 of the ring together, and clamp them tightly in place upon a pair of pipe lengths, a quick acting clamp is employed on either side of the ring for cooperation with the adjacent pairs of lips 24. In the present instance this clamp takes the form of a hollow frame 29, preferably a metal forging. On one side of the frame there is a fixed fulcrum edge 30 of rounded contour adapted to fit into one of the grooves 25 of the clamping ring. Opposite this fulcrum edge 30 the frame 29 carries a movable clamping member 31 which is joined to the frame proper by a narrow neck of metal 32. The clamping member 31 is therefore forged integral with the frame proper but extends laterally therefrom at an angle, as indicated in Fig. 1, leaving a triangular space 33 back of the member 31 and between that member and the adjacent surface of the frame proper. A fulcrum edge 34 of rounded contour is formed on the clamping member 31 for engagement with one of the grooves 25.

When the clamping frames 29 are placed in the position indicated in Fig. 1, and the upper part of each frame is swung inwardly toward the pipe lengths around the fulcrum edge 30, the clamping member 31 is pressed back toward the plane of the frame 29 and the fulcrum edge 34 is caused to bury itself firmly in the adjacent groove 25. When the swinging movement is completed the triangular space 33 is eliminated and the member 31 occupies the position shown in Fig. 2.

In order that the two clamping frames may be brought to operative position quickly and effectively, I prefer to employ a pair of special tools 35, as shown in Fig. 1. Both clamping frames may be set to operative position at the same time, the operator taking one of the handles of the two tools 35 in each hand and swinging them toward each other. In this manner the action of one clamping frame offsets that of the other, and eliminates rotation of the ring sections upon the pipes, as might occur if an attempt were made to set the clamping frames one at a time.

When the clamping frames are adjusted and set in operative position, as above explained, the clamping rings are firmly locked together and to the pipe lengths, and it is difficult to dislodge the clamping frames, particularly without special tools, so that unauthorized tampering with the couplings or pipe joints is not likely to be successful. While the neck of metal 32 in the clamping frame is narrow and does not of itself possess much strength, it will be observed that when the clamping frame is set the clamping member 31 is backed by metal extending across the full thickness of the frame 29, and hence the frame is as strong as though the part 31 were joined to the frame across the entire thickness of the latter.

Having thus described my invention, I claim:

1. A gasket for pipe couplings comprising a hollow body of yieldable material having side walls extending toward the axis of the gasket, flanges extending axially inwardly toward each other from the inner or free portions of the side walls, thereby forming two substantially annular surfaces facing the axis of the gasket, and pipe engaging beads spaced apart on each of said surfaces and including beads at the free edges of the flanges.

2. A gasket for pipe couplings comprising a hollow body of yieldable material having side walls extending toward the axis of the gasket, flanges extending axially inwardly toward each other from the inner or free portions of the side walls, thereby forming two substantially annular surfaces facing the axis of the gasket, and pipe engaging beads spaced apart on said surfaces and including beads at the free ends of the flanges and beads adjacent the outer ends of said surfaces.

3. A gasket for pipe couplings comprising a hollow body of yieldable material having side walls projecting toward the axis of the gasket, and substantially cylindrical flanges projecting axially inwardly of the gasket from the inner or free edges of the side walls toward each other and forming two annular surfaces facing the axis of the gasket, each of said surfaces having pipe engaging beads at its outer end adjacent the corresponding side wall and at its inner end at the free edge of the corresponding flange.

4. A gasket for pipe couplings comprising a hollow body of yieldable material having side walls extending toward the axis of the gasket, flanges extending axially inwardly toward each other from the inner or free portions of the side walls thereof forming two substantially annular surfaces facing the axis of the gasket, and pipe engaging beads axially spaced apart on each of said surfaces.

HOWARD F. JOHNSON.